United States Patent
Kasperchik et al.

(10) Patent No.: US 8,859,061 B2
(45) Date of Patent: Oct. 14, 2014

(54) METALLIC PRINTING

(71) Applicant: Hewlett-Packard Development Company, LP, Houston, TX (US)

(72) Inventors: Vladek Kasperchik, Corvallis, OR (US); Pavel Kornilovich, Corvallis, OR (US); Xiaoqi Zhou, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2 days.

(21) Appl. No.: 13/659,176

(22) Filed: Oct. 24, 2012

(65) Prior Publication Data

US 2014/0113114 A1    Apr. 24, 2014

(51) Int. Cl.
  *B41M 5/52* (2006.01)
  *B32B 5/22* (2006.01)
  *C09D 11/322* (2014.01)
  *C09D 11/326* (2014.01)

(52) U.S. Cl.
  CPC ......... *B41M 5/5218* (2013.01); *B41M 5/5227* (2013.01); *Y10S 977/773* (2013.01)
  USPC ................. 428/32.34; 106/31.65; 106/31.86; 106/31.9; 347/100; 977/773

(58) Field of Classification Search
  CPC ..... B41M 5/5218; B41M 5/5227; B32B 5/22; C09D 11/322; C09D 11/326
  USPC ............... 428/32.34; 106/31.65, 31.86, 31.9; 347/100; 977/773
  See application file for complete search history.

(56) References Cited

U.S. PATENT DOCUMENTS

| 7,232,600 | B2 * | 6/2007 | Misuda ............... 428/195.1 |
| 8,047,575 | B2 * | 11/2011 | Einhorn et al. .......... 283/72 |
| 2004/0000254 | A1 | 1/2004 | McElligott et al. |
| 2006/0083871 | A1 | 4/2006 | Chen |
| 2006/0111466 | A1 | 5/2006 | Bujard et al. |
| 2006/0192183 | A1 | 8/2006 | Klyszcz et al. |
| 2007/0076069 | A1 | 4/2007 | Edwards et al. |
| 2007/0281136 | A1 | 12/2007 | Hampden-Smith et al. |
| 2011/0303885 | A1 | 12/2011 | Vanheusden et al. |
| 2012/0098248 | A1 | 4/2012 | Kasperchik et al. |

FOREIGN PATENT DOCUMENTS

WO    2010028285    3/2010

OTHER PUBLICATIONS

International Search Report and Written Opinion dated Dec. 26, 2013 for International Application No. PCT/US2013/066568, Applicant Hewlett-Packard Development Company, L.P.

\* cited by examiner

*Primary Examiner* — Bruce H Hess (57) ABSTRACT

The present disclosure is drawn to an ink sets, printed articles, and related methods. The ink set can comprise a pre-treatment ink and a reflective ink. The pre-treatment ink can comprise a first liquid vehicle and inorganic pigment particles having an average particle size ranging from 20 nm to 300 nm and a refractive index of less than 2. The reflective ink can comprise a second liquid vehicle and metal oxide particles having an average particle size from 3 nm to 180 nm, wherein the average particle size of the metal oxide particles is smaller than the average particle size of the inorganic pigment particles. The reflective ink is formulated to have a metallic luster when overprinted on pre-treatment ink.

16 Claims, 2 Drawing Sheets

METALLIC PRINTING

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. More specifically, current inkjet printing technology involves forcing the ink drops through small nozzles by thermal ejection, piezoelectric pressure, or oscillation, onto the surface of a media.

As expanded colors and appearances are sought for home or office decorative printing, as well as for commercial package printing, developments have been made to provide inkjet prints and printed articles with specific features related to specialty inks. However, printed articles with such specific features are noticeably limited among current available options. Accordingly, investigations continue into developing media, ink, and/or printed articles that exhibit specific properties other than mere coloration.

BRIEF DESCRIPTION OF THE DRAWING

The drawings illustrate various embodiments of the present article and are part of the specification.

DETAILED DESCRIPTION

The present disclosure is drawn to an ink set for metallic printing, a printed article with metallic appearance, and a method of forming a printed article with metallic appearance. In accordance with this, the ink set can comprise a pre-treatment ink and a reflective ink. The pre-treatment ink includes a first liquid vehicle and inorganic pigment particles having an average particle size ranging from 20 nm to 300 nm and a refractive index of less than 2. The reflective ink includes a second liquid vehicle and metal oxide particles having an average particle size from 3 nm to 180 nm, wherein the average particle size of the metal oxide particles is smaller than the average particle size of the inorganic pigment particles. When printed, the voids or pores that remain between inorganic pigments are smaller than the size of the metal oxide particles, thus, providing a safety net or barrier between the porous coated media substrate and the printed metallic (reflective) ink layer. It is noted that in this and other related examples, the reflective ink does not contain true metallic (elemental) particles, but rather produces a layer with metallic appearance or reflectivity that simulates a metal layer on the print surface. Even so, the reflective ink, when overprinted on pre-treatment ink, can have a metallic luster. For example, the reflective ink can provide a specular reflectivity of at least twice (2×) that of the pre-treatment ink when the reflective ink is printed on the pre-treatment ink in layers, e.g., sequential layers. In one example, the pre-treatment ink and the reflective ink are inkjet inks, and typically include, independently, water, surfactant, organic co-solvent, etc. The first liquid vehicle can be the same or different than the second liquid vehicle.

In another example, a printed article with metallic appearance can comprise a porous media substrate, a pre-treatment ink layer printed on the porous media substrate, and a reflective ink layer printed on the pre-treatment ink layer. The porous media substrate can be any media substrate used in the inkjet arts, included both coated and uncoated media, but the inks of the present disclosure are particularly useful when printed on media with porous coatings applied thereto. An advantage of the inks described herein is that they work well over a wide variety of media types. The pre-treatment ink layer can be colorless and can comprise inorganic pigment particles having an average particle size ranging from 20 nm to 300 nm and a refractive index of less than 2. In this example, the average particle size of the inorganic pigment particles is larger than the average pore size on a printing surface of the porous media substrate. In one example, the reflective ink layer can comprise metal oxide particles having an average particle size from 3 nm to 180 nm. The average particle size of the metal oxide particles is smaller than the average particle size of the inorganic pigment particles. In one example, the average particle size of the metal oxide particles is also smaller than the average pore size on the printing surface of the porous media substrate. Thus, in this example, the pre-treatment ink layer acts as a "safety net" over the pores of the porous media substrate, preventing the metal oxide particles from falling through the pores of the porous media substrate. Additionally, it is noted that in one example, the pre-treatment ink layer is only applied directly beneath where the reflective ink layer is applied, thus providing efficiencies with respect to pre-treatment ink volume savings. Again, the reflective ink layer can have a metallic luster, metallic appearance, and/or can provide a specular reflectivity of at least twice (2×) that of the pre-treatment ink layer when the reflective ink layer is printed on the pre-treatment ink layer.

In another example, a method for forming a printed article with a metallic appearance can comprise inkjet printing a pre-treatment ink onto a porous media substrate to form a pre-treatment ink layer, and inkjet printing a reflective ink onto the pre-treatment ink layer after the pre-treatment ink has at least partially dried to form layer with a metallic luster. By "at least partially dried," what is meant is that the pre-treatment ink layer has enough time to dry so that it does not completely mix with the subsequently applied reflective ink layer. This may occur in a very short period of time, e.g., less than 0.1 second, less than 0.5 seconds, less than 1 second, less than 2 seconds, less than 5 seconds, etc. By allowing the pre-treatment ink layer to at least partially dry, this results in the formation of two discrete layers of ink (one colorless and one with a reflective character or metallic luster). It is noted that "discrete" refers to layers that are at least partially discrete, i.e. there can be some mixing at the interface, but there is at least some significant (e.g., more than 50%) portion of each layer that remains discretely separated from the adjacently printed layer. The pre-treatment ink layer comprise inorganic pigment particles having an average particle size ranging from 20 nm to 300 nm and a refractive index of less than 2 or lower. The average particle size of the inorganic pigment particles can be larger than the average pore size on a printing surface of the porous media substrate. The reflective ink layer comprises metal oxide particles having an average particle size from 3 nm to 180 nm. The average particle size of the metal oxide particles is smaller than the average particle size of the inorganic pigment particles. In one example, the average pore size of the porous media substrate is larger than the average particle size of the metal oxide particles.

In some of the above examples, that the term "colorless" is used to describe the pre-treatment ink layer and/or the inorganic pigment particles that can be dispersed in the pre-treatment ink layer or the pre-treatment ink. It is understood that most printed layers and inorganic pigments are not completely colorless. However, when applied as described herein, the pre-treatment ink layer will appear to an ordinary observer to have essentially the same color (or no color) as the media to which it is printed on. Thus, the terms "colorless" provides some minor flexibility, provided the pre-treatment ink layer is essentially colorless compared to the porous media substrate, and does not have any significant impact on the hue of a subsequently printed layer (the reflective ink layer). Likewise, a colorless pigment is a pigment that, when included in an ink, does not impart any significant or apparent color compared to the porous media substrate it is printed upon.

Turning now to specific structural and compositional components of the present disclosure, various details are provide by way of example regarding the porous media substrate, the pre-treatment ink and related ink layer deposited there from, and the reflective ink and the related ink layer deposited there from.

Thus, as mentioned, the inks of the present disclosure can be printed on a wide variety of substrates. However, one advantage of the present ink sets and methods is that porous media can be used with relatively large pores that are larger, by average, in size than the average size of the metal oxide particles used to generate the metallic sheen or luster described herein.

Examples of printable media that can be used include various coated types of paper, but works particularly well on porous coated media substrates with average pore size of less than 1 µm, or less than 750 nm, or less than 500 nm. For example, these inks, when printed in layers, can be applied to porous media with relatively large pores (e.g., less than 300 nm, less than 250 nm, less than 200 nm, etc.), provided the pores are of an average size that the inorganic pigments of the pre-treatment inks can be used as a safety net to prevent the metal oxide particles of the reflective layer from falling through the pores of the media. In one example, the pores in the porous media can range from 3 nm to 300 nm.

In further detail regarding the porous media substrate, when coated with a printable porous coating, the porous media substrate can comprise both a supporting base and a porous coating layer. Suitable supporting base material that can be used includes paper, plastic, cardboard, etc., providing a bottom substrate layer suitable for a porous coating layer. Applied to the supporting base is porous coating layer, and together the supporting base and the porous coating layer form a recording material that can be well adapted for use with an inkjet printing device.

The supporting base and the porous coating layer may take the form of a sheet, a web, or a three-dimensional object of various shapes. Likewise, the supporting base can be of any type and size and can be any material that will be able to provide a mechanical support to the above-mentioned layers. In some examples, the supporting base can be a flexible film or a paper-based substrate, including both rigid and flexible substrates. The supporting base can also be selected from cellulosic or synthetic paper (coated or uncoated), cardboard, polymeric film (e.g. plastic sheet like PET, polycarbonate, polyethylene, polypropylene), fabric, cloth and other textiles.

The bottom substrate layer may also be a single material plastic film made from PET, polyimide or another suitable polymer film with adequate mechanical properties. In some examples, the supporting base can include any substrate that is suitable for use in digital color imaging devices, such as electrophotographic and/or inkjet imaging devices, including, but in no way limiting to, resin coated papers (so-called photobase papers), regular papers, overhead projector plastics, coated papers, fabrics, art papers (e.g. water color paper), plastic film of any kind, and the like. In further detail, the supporting base can be paper (non-limitative examples of which include plain copy paper or papers having recycled fibers therein) or photopaper (non-limitative examples of which include polyethylene or polypropylene extruded on one or both sides of paper), and/or combinations thereof. In yet some other examples, the supporting base can be a photobase. Photobase is a coated photographic paper, which includes a paper base extruded on one or both sides with polymers, such as polyethylene and polypropylene. Photobase support can include a photobase material including a highly sized paper extruded with a layer of polyethylene on both sides. In this regard, the photobase support can be an opaque water-resistant material exhibiting qualities of silver halide paper. The photobase support can include a polyethylene layer having a thickness of 10 to 24 grams per square meter (gsm or g/m$^2$). The photobase support can also be made of transparent or opaque photographic material.

Coated on the supporting base is the porous coating layer described above. Typically, this layer is pre-coated on the supporting base by an analog process, i.e. non-digital process, using coating technology such as Meyer rod coating, curtain coating, knife coating, roller coating, spray coating, slot die coating, etc. With porous coating layer present on the porous media substrate, the layer can have an average pore diameter that is either larger or smaller than the diameters of metal oxide particles that are part of the reflective ink composition applied to form the printed article. However, an advantage of the present disclosure is that porous media substrate can have surface pores that are larger than that of the metal oxide particles because the pre-treatment ink coating applied there effectively prevents the metal oxide particles from falling through the porous media substrate pores.

The printed article, depending on the porous media substrate chosen for printing, can be useful for forming articles that have, for examples, decorative applications, such as greeting cards, scrapbooks, brochures, signboards, wall paper, business cards, certificates, packaging, and other similar applications.

Turning now to the inks and related coating layers of the present disclosure, there are essentially two types of inks that are described herein, i.e. reflective inks and pre-treatment inks. However, it is noted that other inks and/or ink layers can be included in the ink sets of the present disclosure, such as standard inks with dye or pigment colorants, or multiple reflective inks and/or multiple pre-treatment inks. Thus, in describing the two types of inks of the present disclosure, it does not infer that only two inks are necessarily present or in use.

Regarding the pre-treatment inks, there are many formulations that can be used in accordance with examples of the present disclosure, provided the pre-treatment ink is formulated to provide a "safety net" for metal oxide particles found in subsequently applied reflective ink layers. For example, the pre-treatment ink can comprise inorganic pigment particles having an average particle size ranging from 20 nm to 300 nm and a refractive index of less than 2, as mentioned above. In one example, the particle size can be from 40 nm to 100 nm.

In another example, the refractive index can be less than 1.75, and in some specific examples, less than 1.5. Particle size of the inorganic pigment can be selected based on the size of the pores that may be present on the porous media substrate for which the pre-treatment ink is to be used, as well as the size of metal oxide particles that will be present in subsequently applied layers of reflective ink.

In further detail, suitable inorganic pigments include metal oxides and/or semi-metal oxides particles that may be independently selected from silica, alumina, boehmite, silicates (such as aluminum silicate, magnesium silicate, and the like), titania, zirconia, calcium carbonate, clays, or combinations thereof. In some examples, the inorganic pigments particles are modified or unmodified fumed silica. If silica is used, it can be selected from the group of commercially available fumed silica: Cab-O-Sil® LM-150, Cab-O-Sil® M-5, Cab-O-Sil® MS-55, Cab-O-Sil® MS-75D, Cab-O-Sil® H-5, Cab-O-Sil® HS-5, Cab-O-Sil® H-5, Aerosil® 150, Aerosil® 200, Aerosil® 300, Aerosil® 350, and/or Aerosil® 400. In some other examples, the inorganic particulate pigments are modified or unmodified alumina. The alumina coating can comprise pseudo-boehmite. Commercially available alumina particles can be used, including, but not limited to, Sasol Disperal® HP10, Disperal®HP14, boehmite, Cabot Cab-O-Sperse® PG003 and/or CabotSpectrAl® 81 fumed alumina.

The inorganic pigment particles can be from 30 nm to 300 nm in size, and optionally, can have Brunauer-Emmett-Teller (BET) surface area from 100 to 400 square meters per gram. The pre-treatment ink layer can also contain fumed silica or fumed alumina aggregates primary particles. Though any printable aggregate size can be used, for inkjet technology in particular, aggregates having an average particle size ranging from 100 nm to 250 nm can be particularly useful. Regarding the pre-treatment ink formulation per se, the amount of inorganic pigment dispersion in the ink may be from 30 wt % to 90 wt %, or from 40 wt % to 80 wt %, based on the total weight of the pre-treatment ink. However, it is noted that the inorganic pigment dispersion typically has a solids content in the 2 wt % to 50 wt % range. Thus, the solids content or inorganic pigment in the pre-treatment ink is typically in the range of 1 wt % to 45 wt %, and more typically from 2 wt % to 35 wt %. It is also noted that in the pre-treatment ink layer, the concentrations of inorganic pigment particles will be greater than in the ink as the solvent and other liquid components dry after printing.

In forming the printable article described herein using the ink sets of the present disclosure, the pre-treatment ink can be printed on the porous media substrate just prior to printing a reflective ink thereon. Because of the relatively larger size of the inorganic pigment particles compared to the metal oxide particles of the reflective ink, these particles act to "hide" or "fill" larger pores that may be present on a given type of media. For example, often, there are large pores and surface irregularities (topography) of the inkjet paper that would otherwise receive and hide the metal oxide particles of the reflective ink were it not for the pre-treatment ink applied to the porous media substrate as an underprinted layer. If this were to occur, a significant degree of luster can be lost from the outermost surface of the porous media substrate. By first applying the pre-treatment ink to the substrate, a smoother nano-porous layer can be formed that is capable of retaining the metal oxide particles at or nearer to the print surface.

Additionally, when selecting material for use in the pre-treatment ink, a low bulk refractive index can be used for improved performance. As mentioned, a refractive index of less than 2 works well. In a more specific example, a refractive index less than 1.8 can also be effective for use, and in another specific example, or alternatively, can range from 1.2 to 1.7 in one example. Reflectivity (and metallic luster) of an iron oxide layer (described below) on the print surface can be highly dependent on strong light reflection from the interface between the metal oxide particles and the underprinted inorganic pigment material. Thus, the higher the interfacial refractive index difference between the two layers, often, the stronger the reflectance from the interface. Refractive index of metal oxides, such as iron oxide, is quite high, greater than 2.2. That being said, the inorganic pigment used for use in the pre-treatment ink undercoating can be prepared to have relatively low refractive index (the lower—the better). Both alumina (n~1.65) and silica (n~1.45) satisfy this difference desirability. However, it is noted that even lower levels can also be achieved, such as when using silica or alumina particles having a larger percentage of void space, e.g., 50 vol % voids. With these type of materials, the refractive index can range from 1.2 to 1.4, for example.

The pre-treatment ink layer can be applied to the porous media substrate at a coat weight that is sufficient to cover the media pores and prevent the metal oxide particles from substantially falling into the media pores. Exemplary coat weights for this layer can be from 1 to 40 gram per square meter ($g/m^2$), with an inorganic pigment solids content ranging from 0.1 to 10 $g/m^2$. With multiple passes and some drying between passes, the upper limit of the inorganic solids content can be increased to as high as 20 $g/m^2$. The pre-treatment ink layer can alternatively have coat-weight in the range of 2 to 30 $g/m^2$ or in the range of 5 to 25 $g/m^2$. The pre-treatment ink layer can have an absorption capacity (porosity) ranging from 0.6 to 1.2 liter/gram.

In accordance with this, in some examples, the pre-treatment ink layer can be formed to have an average pore size in the range of 1 to 150 nm or in the range of 3 to 50 nm. For example, the pore size can be small enough to generate capillary pressure sufficient for compacting pigment particles on the surface of the media into an optically smooth highly reflective layer, which will be in good condition to receive and accept the reflective ink layer that is subsequently applied thereto.

Turning now to the reflective inks more specifically, in some examples, ink sets, printed articles, and methods described herein can be prepared to generate a metallic luster that provides high metallic reflectivity, and optionally other high print quality characteristics, e.g., enhanced print edge definition, optical density, etc. For example, the printed articles prepared as described herein can have an optical reflectivity of a metal foil, or more commonly, at least a shiny metallic appearance. Thus, the printed article can exhibit a sparkling appearance from reflected light and can have the tendency to reflect at a specular angle when exposed to a directional light source. By "metallic appearance," what is meant herein is that the printed article has an opaque or a semi-opaque appearance and reflects the light as a metal reflects light, i.e. shows strong directional reflectivity of incident light. Furthermore, by "metallic luster," it is meant herein that the printed article has some characteristic of metals and can exhibit a high (greater than 200 gloss units) gloss, or sheen, that are often referred to as looking "metallic."

In certain examples, the ink sets and methods can be used to prepare a printed article that includes printed features having a metallic appearance as defined by specular reflectivity of that superior to or, at least equal, to 10%. This means that this printed layer is able to reflect light at an angle of incidence of 20 degrees at least at 10% of the incident light intensity. In another example, the printed layer is able to reflect light at a specular angle of at least 25% of the incident light intensity. Without being bound by any theory, it is believed that the human perception of "metallic" of an object is related to ability of an observer to catch specular light reflection of directional light source coming off an object surface. The smooth surface begins to looks metallic if it is able to reflect at a specular angle more than, approximately, 10% of the incident light intensity (highly polished surface of true metals can reflect up to 85 to 95% of incident visible light). The higher is the intensity of the reflected light at specular angle (combined with low reflection off specular angle), the more metallic the appearance of the object surface. In one example, the pre-treatment ink layer and the reflective ink layer, in combination, form a printed feature with a combined thickness in the range of 40 nm to 10,000 nm. In this example, the printed feature can comprise metal oxide particles coverage in the range of 3 µg/cm² to 80 µg/cm².

In further detail regarding the measurement of specular reflectivity and the increase in specular increase that can be achieved in accordance with examples of the present disclosure, it is noted that a comparison between the pre-treatment ink layer and reflective ink layer can be conducted to determine the increase in specular reflectivity from layer to layer. Essentially, in one example, an inkjet brochure paper, such as HP Inkjet Brochure Paper 180G or the Brochure Paper described generally in Example 4 below, is coated with a pre-treatment ink layer at about 50 pL/300$^{th}$ pixel. The specular reflectivity of the pre-treatment ink layer is determined using directional light at a 20 degree angle of incidence, as is known in the art. Next, the pre-treatment ink layer is over-printed on the reflective ink at a flux of about 56 pL/300$^{th}$ pixel. The specular reflectivity is then calculated in the same manner. Thus, specular reflectivity can be said to said to have increase two-fold (2×) if the total specular reflectivity is increased by 100%, e.g., from 5% for the pre-treatment ink layer to 10% for the reflective ink layer. In other examples, the specular reflectivity can be increased four-fold (4×), eight-fold (8×), or twelve-fold (12×), as shown and described below in Example 5.

By pre-treating or coating a porous media substrate with the pre-treatment inks described above, the resulting printed article can form a uniform coating that exhibits the metallic appearance described herein. With application of the light onto the printed article, the angles of specular reflection can also vary with textured topography. Such variations of the reflective angles can create multiple specular reflections off the print surface and create a sparkling metallic appearance.

The reflective ink composition used to form the metallic sheen or luster, as mentioned, forms an essentially uniform coating with strong sparkling and metallic reflective appearance, e.g., a metallic luster. The metal oxide particles that can be used include titanium oxides (e.g., $TiO_2$), zinc oxides (e.g., ZnO), indium oxides (e.g., $In_2O_3$), manganese oxides (e.g., $Mn_3O_4$, $MnO_2$), iron oxides (e.g., $Fe_3O_4$), and mixtures thereof. Each of these categories of metal oxides can include multiple compounds. For example, "iron oxide" includes any chemical compounds composed of iron and oxygen. For example, the term "iron oxide(s)" encompass iron oxides, iron hydroxides, and oxide/hydroxides, Examples of iron oxides include iron (II) oxide (wüstite, FeO), iron (II,III) oxide (magnetite, $Fe_3O_4$) and iron (III) oxide (hematite, $Fe_2O_3$). Examples of iron hydroxides include iron (II) hydroxide ($Fe(OH)_2$) and iron (III) hydroxide ($Fe(OH)_3$) and oxihydroxide FeO(OH). Without being bound by any theory, it is believed that magnetite ($Fe_3O_4$) and hematite ($Fe_2O_3$) are oxidatively stable in aqueous environment; however, wüstite (FeO) is oxidatively unstable and can readily revert to $Fe_2O_3$ or $Fe_3O_4$. In one specific example, when the metal oxide is provided by $Fe_3O_4$ iron oxide particles, the printed article exhibits a gold-like appearance. By "gold-like appearance," what is meant is that the printed article has a visual appearance of gold-plated surface and has the color of metallic gold (Au). Thus, the printed article approximates the gloss, sheen, and color a gold object. The ink composition forms a uniform coating with strong metallic reflective appearance, which can have a metallic luster and gold-like appearance.

As mentioned and in further detail, the reflective ink can also include an ink vehicle and a colloidal dispersion of the metal oxide particles. The average particle size of the metal oxide particles can be in the range of 3 nm to 180 nm. In some examples, the average particle size of iron oxides is in the range of 5 nm to 150 nm and, in some other examples, in the range can be from 10 nm to 100 nm.

The reflective ink can also comprise a liquid vehicle and a concentration of metal oxide particles, such as $Fe_3O_4$, that is from 0.1 wt % to 15 wt % of the total weight of the reflective ink composition. In some examples, the iron oxide particles are present in an amount representing from 0.2 wt % to 12 wt %. In some other examples, the iron oxide particles are present in an amount representing from 0.5 wt % to 6 wt % of the total weight of the ink composition.

The metal oxide particles, such as $Fe_3O_4$ or other particles, can be dispersed with dispersants, though this is not always required. Examples of suitable dispersants include, but are not limited to, water-soluble anionic species of low and high molecular weight such as phosphates and polyphosphates, phosphonates and polyphosphonates, phosphinates and polyphosphinates, carboxylates (such as citric acid or oleic acid), polycarboxylates (such as acrylates and methacrylates). Other examples include hydrolysable alkoxysilanes with alkoxy group attached to water-soluble (hydrophilic) moieties such as water-soluble polyether oligomer chains. In some examples, the dispersant used to disperse iron oxide particles, such as $Fe_3O_4$, is a polyether alkoxysilane dispersant.

Examples of polyether alkoxysilane dispersants used to dispersed iron oxide particles can represented by the following general Formula (I):

(I)

where $R^1$, $R^2$ and $R^3$ are independently hydroxy groups, or linear or branched alkoxy groups. In some examples, $R^1$, $R^2$ and $R^3$ are linear alkoxy groups having from 1 to 5 carbon atoms. In some other examples, $R^1$, $R^2$ and $R^3$ groups can independently or alternatively be —$OCH_3$ or —$OC_2H_5$. PE is a polyether oligomer chain segment of the structural formula $[(CH_2)_n—CH(R)—O]_m$, wherein n is an integer ranging from 0 to 3, and m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—$CH(CH_3)$—O—), or a mixture of both types. In some other examples, the polyether chain segment (PE) contains PEG units (—$CH_2CH_2$—O—). $R^4$ can be independently hydrogen, or a linear or a branched alkyl group. In some examples, $R^4$ is an alkyl group having from 1 to 5 carbon atoms.

Examples of suitable polyether alkoxysilanes that can be used include $HO(CH_2CH_2O)_{n'}$—$Si(OCH_3)_3$; $HO$—$(CH_2CH_2O)_{n'}$—$Si(OCH_2CH_3)_3$; $CH_3O$—$(CH_2CH_2O)_{n'}$—$Si(OCH_3)_3$; $CH_3$—$O$—$(CH_2CH_2O)_{n'}$—$Si(OCH_2CH_3)_3$; $C_2H_5O$—$(CH_2CH_2O)_{n'}$—$Si(OCH_3)_3$; $C_2H_5O$—$(CH_2CH_2O)_{n'}$—$Si(OCH_2CH_3)_3$; $HO$—$(CH_2CH(CH_3)O)_{n'}$—$Si(OCH_3)_3$; $HO$—$(CH_2CH(CH_3)O)_{n'}$—$Si(OCH_2CH_3)_3$; $CH_3$—$O$—$(CH_2CH(CH_3)O)_{n'}$—$Si(OCH_3)_3$; $CH_3O$—$(CH_2CH(CH_3)O)_{n'}$—$Si(OCH_2CH_3)_3$, wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, Silquest®A-1230 manufactured by Momentive Performance Materials and Dynasylan® 4144 manufactured by Evonik/Degussa.

The amount of dispersant used in the metal oxide dispersion may vary from 1 wt % to 300 wt %, based on the metal oxide particle content. In some examples, the dispersant content range can be from 2 wt % to 150 wt % of the metal oxide particle content. In still other examples, the dispersant content range is from 5 wt % to 100 wt % of the metal oxide particle content. In some examples, the ink composition is based on fine particles of metal oxide particles, such as $Fe_3O_4$, in an aqueous ink vehicle. The dispersion of particles can be prepared via milling or dispersing the metal oxide powder in water in the presence of suitable dispersants.

As an example, an iron oxide ($Fe_3O_4$) pigment dispersion is used to describe principles of the present disclosure. However, other metal oxide pigment dispersions can also be prepared similarly. With this in mind, an $Fe_3O_4$ pigment dispersion may be prepared by milling commercially available inorganic oxide pigment having large particle size (in the micron range) in the presence of the dispersants described above until the desired particle size is achieved. The starting dispersion to be milled is an aqueous dispersion with solid content up to 40 wt % of the iron oxide pigment. The milling equipment that can be used is a bead mill, which is a wet grinding machine capable of using very fine beads having diameters of less than 1.0 mm as the grinding medium, for example, Ultra-Apex Bead Mills from Kotobuki Industries Co. Ltd. The milling duration, rotor speed and temperature may be adjusted as known to those skilled in the art to achieve the results desired. The pH of the ink may be in the range of pH 3 to pH 11. In some examples, the pH of the ink can be from pH 5 to pH 9 and, in some other examples, from pH 5.5 to pH 9. The pH of the ink composition may be adjusted by addition of organic or inorganic acids or bases, i.e. pH adjusting agent, but this is not required. The ink composition can have a viscosity within the range of 1 cps to 10 cps, or within the range of 1 cps to 7 cps, as measured at 25° C.

Whether describing the pre-treatment ink or the reflective ink, the particles (inorganic pigments or metal oxide particles, respectively) are typically prepared for printing and carried by a liquid vehicle. Stated more generally, as used herein, "liquid vehicle" is defined to include any liquid composition that is used to carry inorganic pigment (in the pre-treatment ink) or metal oxide particles (in the reflective ink) to the substrate. A wide variety of liquid vehicle components may be used therein, including a mixture of a variety of different agents, including without limitation, surfactants, solvent and co-solvents, buffers, biocides, viscosity modifiers, and water. In some examples, the liquid vehicle is an inkjet liquid vehicle. Typical liquid vehicle formulations described herein can include water, and can further include co-solvents present in total at from 0.1 wt % to 50 wt %, depending on the jetting architecture, though amounts outside of this range can also be used. For example, the solvent can be used in an amount representing from 0.1 wt % to 30 wt % of the ink composition, or can be used in an amount representing from 8 wt % to 25 wt % of the ink composition. The water can make up the a large portion of the liquid vehicle, and in some examples, may be present in an amount representing from 20 wt % to 90 wt %, or may be present in an amount representing from 30 wt % to 80 wt % of the total composition. Further, non-ionic, cationic, and/or anionic surfactants can be present, ranging from 0.01 wt % to 10 wt %. In addition to the particles carried by the respective inks as described herein, the inks can include more traditional colorants, though in the pre-treatment ink, this will typically not be the case unless the reason for inclusion is to match the color of a media substrate, or to render an ink more invisible by masking a discoloration, for example. The balance of the formulation can be any other vehicle components known in the art, such as biocides, viscosity modifiers, materials for pH adjustment, sequestering agents, preservatives, and the like.

Examples of suitable classes of organic solvents include polar solvents, such as amides, esters, ketones, lactones, and ethers. In additional detail, co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, N-methylpyrrolidone (NMP), dimethyl sulfoxide, sulfolane, glycol ethers, alkyldiols such as 1,2-hexanediol, ethoxylated glycerols such as LEG-1, etc.

In addition to water and the other liquid vehicle components, various types of agents may be present in the ink composition to provide certain properties to the ink compositions for specific applications. The various ink compositions may also include, for example, any number of buffering agents and/or biocides. Examples of suitable biocides include, but are not limited to, benzoate salts, sorbate salts, commercial products such as Nuosept® (ISP), Ucarcide® (Dow), Vancide® (RT Vanderbilt Co.) and Proxel® (Avecia), Kordek® MLX (Rohm and Haas), and other known biocides. Such biocides may be contained in amount representing less than 5 wt % of the ink composition. Surfactants can also be used and may include water-soluble surfactants, such as alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, fluorosurfactants, and mixtures thereof. In some examples, fluorosurfactants or ethoxylated surfactants can be used as surfactants. In some other examples, ethoxylated silicone based surfactants are used. If used, the surfactant can be present at from 0.001 wt % to 10 wt % and, in some examples, can be present at from 0.001 wt % to 0.1 wt % of the ink compositions. The ink compositions may also include different types of polymer for enhancing rub or scratch durability of printed feature, or to provide binding properties.

Figure 1:
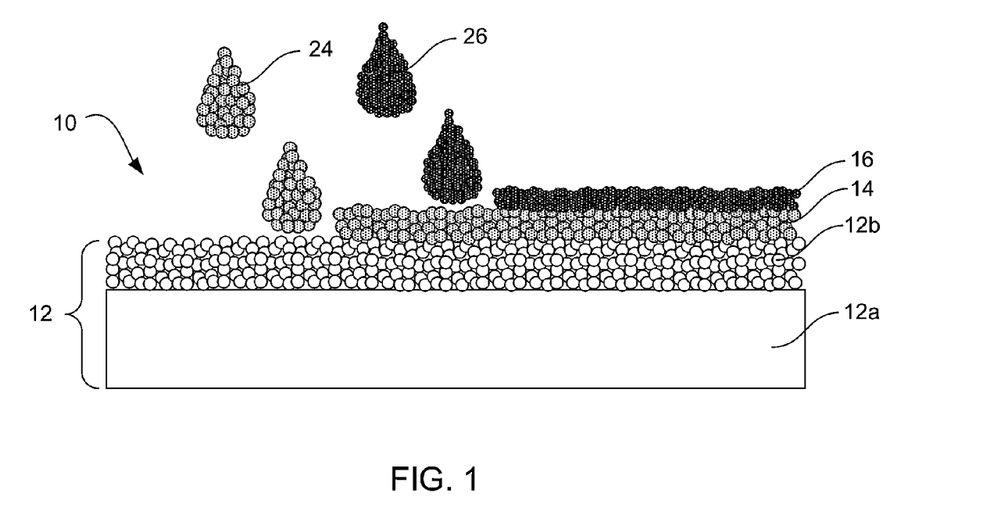
FIG. 1 is a schematic cross-sectional view of a printed article being prepared using an inkjet ink set of the present disclosure.

Returning now to the FIGS., FIG. 1 sets forth schematic cross-sectional image related to method of preparing printed articles 10. In this example, a porous media substrate 12 is overprinted with a pre-treatment ink layer 14 and a reflective ink layer 16. The pre-treatment ink layer is applied from a pre-treatment ink 24 and the reflective ink layer is applied from a reflective ink 26. As shown, the porous media substrate can be coated, and the coating can be highly porous. Thus, the porous media substrate includes both a supporting base 12a (paper or other supporting base material described herein above in greater detail) and a porous coating layer 12b applied thereto. The porous coating layer can include any of a number of materials, including a polymeric binder and inorganic pigments, such as silica, alumina, boehmite, silicates (such as aluminum silicate, magnesium silicate, and the like), titania, zirconia, calcium carbonate, clays, or combinations thereof. It is noted that this porous coating layer that is typically pre-coated on the porous media substrate should not be confused with the pre-treatment ink coating composition that is applied thereto, even though both can include inorganic pigments. The porous coating composition or layer is usually applied using an analog coating process, and not a digital printing process. Appropriate coating methods that are typically used to apply the porous coating layer include Meyer rod coating, curtain coating, knife coating, roller coating, spray coating, slot die coating, etc., for example. Regardless, when the pores of the outermost surface of the porous media substrate are too large to prevent the metal oxide particles from falling therein, the pre-treatment ink layer is applied as a "safety net" to prevent this from occurring.

Figure 2:
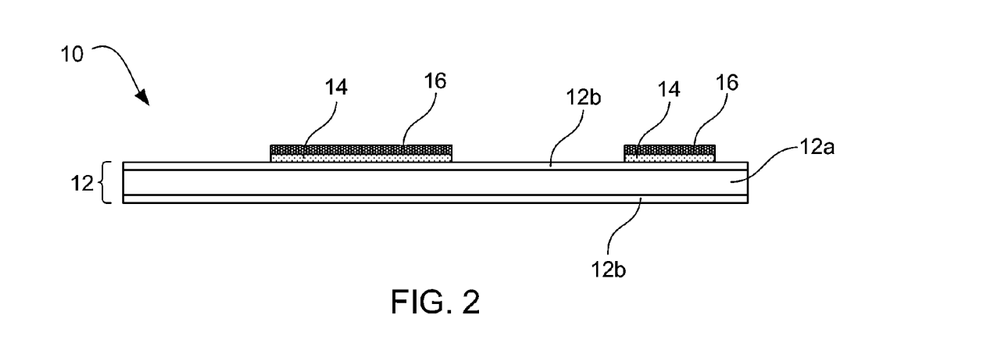
FIG. 2 is a schematic cross-sectional view of an example printed article prepared in accordance with examples of the present disclosure.

FIG. 2 depicts an example of the present disclosure wherein the pre-treatment ink layer 14 is applied to the porous media substrate 12 substantially only where the reflective ink layer 16 is to be applied. In this manner, only the areas of the porous media substrate that need to be coated with the pre-treatment ink layer for purposes of supporting the metal oxide particles of the reflective ink layer are coated. This provides a savings or efficiency compared to coating the entire surface with the inorganic pigment. It is noted in this example that the supporting base 12a is pre-coated on both sides with a porous coating layer 12b on both sides of the supporting base. Thus, there may be one pre-coated side, or two pre-coated sides of the media substrate. If the coated side is used as an image-receiving side, the other side, i.e. backside, may not have any coating at all, or may be coated with other chemicals (e.g. sizing agents) or coatings to meet certain features such as to balance the curl of the final product or to improve sheet feeding in printer.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 to 5" should be interpreted to include not only the explicitly recited values of 1 to 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate some embodiments of the present ink sets, printed articles, and methods that are presently known. However, it is to be understood that the following are only exemplary or illustrative of the application of the principles of the present disclosure. Numerous modifications and alternative ink sets, printed articles, and methods may be devised by those skilled in the art without departing from the spirit and scope of the present compositions and methods. The appended claims are intended to cover such modifications and arrangements. Thus, while the present ink sets, printed articles, and methods have been described above with particularity, the following examples provide further detail in connection with what are presently deemed to be acceptable embodiments Example 1

Alumina-Based Pre-Treatment Inks

Alumina-based pre-treatment inks were prepared according to Tables 1-6 below. The various inorganic pigment particles were processed by milling the particles in a "Kotobuki" Ultra-Apex Bead Mill (UAM-015). In each case, the milling dispersant used was Silquest®A-1230 (available from "Momentive Performance Materials") at various dispersant/pigment ratios. Mean volume-weighted particle sizes of alumina in the dispersions (Mv) also varied, depending on the specific formulation. Also, various concentrations of alumina in the produced dispersion were prepared, as set forth specifically in detail in each of Tables 1-6. Each of the formulations set forth below exhibit excellent inkjetting reliability.

TABLE 1

| Components | wt % |
| --- | --- |
| 2-Pyrrolidinone | 9 |
| LEG-1 | 5 |
| Surfynol ® 465 | 0.2 |
| Water | 35.8 |
| [1]Dispal HP18 Alumina Dispersion (12 wt %) | 50 |
| [2]Total | 100 |

[1]Mv = 60 nm Alumina Inks (Based on Dispal HP18 Alumina milled with 50 wt % of Momentive A-1230 dispersant)
[2]The pH of the mixed ink was adjusted down to 4.5 with $HNO_3$ solution

TABLE 2

| Components | wt % |
| --- | --- |
| 1,2-Hexanediol | 6 |
| 2-Pyrrolidinone | 5 |
| Water | 51.5 |
| [1]Dispal HP18 Alumina Dispersion (12 wt %) | 37.5 |
| [2]Total | 100 |

[1]Mv = 60 nm Alumina Inks (Based on Dispal HP18 Alumina milled with 50 wt % of Momentive A-1230 dispersant)
[2]The pH of the mixed ink was adjusted down to 4.5 with $HNO_3$ solution

TABLE 3

| Components | wt % |
| --- | --- |
| 2-Pyrrolidinone | 9 |
| LEG-1 | 5 |
| Surfynol ® 465 | 0.2 |
| Water | 18.74 |
| [1]Dispal HP18 Alumina Dispersion (12.18 wt %) | 67.06 |
| [2]Total | 100 |

[1]Mv = 90 nm Alumina Inks (Based on Dispal HP18 Alumina milled with 50 wt % of Momentive A-1230 dispersant)
[2]The pH of the mixed ink was adjusted down to 4.5 with $HNO_3$ solution

TABLE 4

| Components | wt % |
| --- | --- |
| 2-Pyrrolidinone | 9 |
| LEG-1 | 5 |
| Surfynol ® 465 | 0.2 |
| Water | 19.43 |
| [1]Dispal HP18 Alumina Dispersion - (12.18 wt %; Mv = 90 nm) | 32.84 |
| [1]Dispal HP18 Alumina Dispersion - (11.93 wt %; Mv = 26 nm) | 33.53 |
| [2]Total | 100 |

[1]Mv = 90 nm and Mv = 26 nm Alumina Ink with bi-modal particle size distribution (Based on 2 dispersions of Dispal HP18 Alumina milled with 50 wt % of Momentive A-1230 dispersant)
[2]The pH of the mixed ink was adjusted down to 4.5 with $HNO_3$ solution

TABLE 5

| Components | wt % |
| --- | --- |
| 2-Pyrrolidinone | 9 |
| LEG-1 | 5 |
| Surfynol ® 465 | 0.2 |
| Water | 20.57 |
| [1]Disperal 40 Alumina Dispersion (15.33 wt %) | 65.23 |
| [2]Total | 100 |

[1]Mv = 72 nm Alumina Ink (Based on Disperal 40 Alumina milled with 50 wt % of Momentive A-1230 dispersant)
[2]The pH of the mixed ink was adjusted down to 4.5 with $HNO_3$ solution

TABLE 6

| Components | wt % |
| --- | --- |
| 2-Pyrrolidinone | 9 |
| LEG-1 | 5 |
| Surfynol ® 465 | 0.2 |
| Water | 14.01 |
| [1]Disperal HP14/2 Alumina Dispersion (13.93 wt %) | 71.79 |
| [2]Total | 100 |

[1]Mv = 35 nm Alumina Ink (Based on Disperal HP14/2 Alumina milled with 50 wt % of Momentive A-1230 dispersant)
[2]The pH of the mixed ink was adjusted down to 4.5 with $HNO_3$ solution

Example 2

Silica-Based Pre-Treatment Ink

A silica-based pre-treatment ink was prepared according to Tables 7 below. The inorganic pigment particles were processed by milling the particles in a "Kotobuki" Ultra-Apex Bead Mill (UAM-015) and the milling dispersant used was Silquest®A-1230 (available from "Momentive Performance Materials"). Mean volume-weighted particle size of the silica in the dispersion (Mv) was 50 nm. Also, the silica was present, by solids, in the pre-treatment ink composition at about 4 wt %. It is noted that the formulation set forth below exhibits excellent inkjetting reliability.

TABLE 7

| Components | wt % |
| --- | --- |
| 2-Pyrrolidinone | 9 |
| LEG-1 | 5 |
| Surfynol ® 465 | 0.2 |
| Water | 35.36 |
| [1]Cab-O-Sil ® HP-60 Dispersion (7.93 wt %) | 50.44 |
| [2]Total | 100 |

[1]Mv = 50 nm Silica Ink (about 4 wt % silica in final composition)
[2]No pH adjustment

Example 3

Reflective Ink Compositions

Dispersions of metal oxide particles were prepared by milling the metal oxide powder, e.g., $Fe_3O_4$ powder (available from "Inframat Advanced Materials") (used in Table 8) and manganese oxide powder (used in Table 9). Such dispersions are produced by milling metal oxide powder in a "Kotobuki" Ultra-Apex Bead Mill (UAM-015) with a dispersant. The milling dispersant used was Silquest®A-1230 (available from "Momentive Performance Materials"). With respect to Table 8, the resulting $Fe_3O_4$ dispersion contains 5.5 wt % of metal oxide $Fe_3O_4$; the average particle size of $Fe_3O_4$ is 22 nm (as measured by "Nanotrac" particle size analyzer); and the dispersant to metal oxide particle ratio was 0.5. With respect to Table 9, the resulting $MnO_2$ dispersion contains 5 wt % of metal oxide $MnO_2$; the average particle size of $MnO_2$ is 25 nm (as measured by "Nanotrac" particle size analyzer); and the dispersant to metal oxide particle ratio was 0.5. Each of the formulations set forth below in Tables 8 and 9 exhibit excellent inkjetting reliability.

TABLE 8

| Components | wt % |
| --- | --- |
| $Fe_3O_4$ Dispersion | 36.2 |
| LEG-1 | 5 |
| 2-Pyrrolidinone | 9 |
| Trizma ® Base | 0.2 |
| Proxer ® GXL | 0.1 |
| Surfynol ® 465 | 0.2 |
| Water | Up to 100 |

TABLE 9

| Components | wt % |
| --- | --- |
| MnO$_2$ Dispersion | 39.6 |
| LEG-1 | 5 |
| 2-Pyrrolidinone | 9 |
| Trizma ® Base | 0.2 |
| Proxel ® GXL | 0.1 |
| Surfynol ® 465 | 0.2 |
| Water | Up to 100 |

Example 4

Inkjet Brochure Paper Porous Media Substrate

An inkjet brochure paper was prepared having a microporous ink-absorbing porous coating layer applied to a paper substrate. The porous coating layer formulation included about (dry wt %) 66 wt % silica particles, about 3 wt % of basic aluminum chloride, about 11 wt % of 88% hydrolyzed polyvinyl alcohol, about 11 wt % of non-ionic HDPE wax, about 6 wt % surfactant, and minor amounts of boric acid and glycerin. This ink-absorbing porous coating layer was used to prepare the printed articles described in Example 5 below.

Example 5

Printed Article Reflectivity of Reflective Ink Layer Compared to Flux Density of Pre-Treatment Ink Layer The pre-treatment ink of Table 1 and the reflective ink of Table 8 were printed in sequence on the brochure paper of Example 4. Specifically, both the pre-treatment ink and the reflective ink were separately filled into ink compartments of an HP C4900A printhead cartridge and printed in sequence (pre-treatment ink followed by the reflective ink) on the brochure paper utilizing HP Officejet Pro 8000 printer. The time gap between jetting pre-treatment ink layer and the reflective ink layer was 2 seconds.

Figure 3:
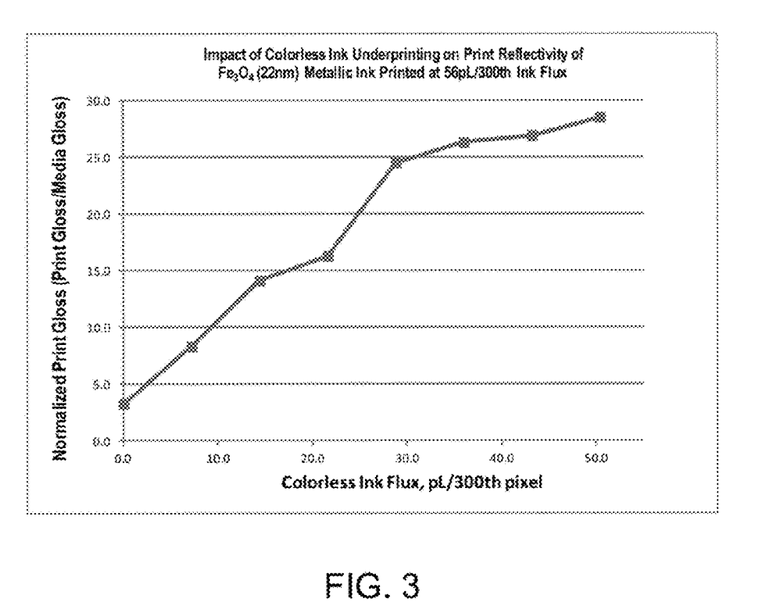
FIG. 3 provides the results of reflective ink reflectivity compared to various pre-treatment ink flux application weights.

FIG. 3 sets forth a comparative study where the ink flux density of the reflective ink was kept constant at 56 pL/300$^{th}$ pixel, while pre-treatment ink flux density was varied from 0 to 50 pL/300$^{th}$ pixel. An increase in print reflectivity (measured as a ratio of print surface Gloss at 20° to gloss of the non-printed media—so-called "normalized print reflectivity") with increase of ink flux density of the pre-treatment ink layer was observed, as shown specifically in FIG. 3.

Example 6

Printed Article Reflectivity for Reflective Ink Layer at Variable Flux Densities Overprinted on Pre-Treatment Ink Layer The pre-treatment ink of Table 4 and the reflective ink of Table 8 were printed in sequence on the brochure paper of Example 4. Specifically, both the pre-treatment ink and the reflective ink were separately filled into ink compartments of an HP C4900A printhead cartridge and printed in sequence (pre-treatment ink followed by the reflective ink) on the brochure paper utilizing HP Officejet Pro 8000 printer. The time gap between jetting pre-treatment ink layer and the reflective ink layer was 2 seconds.

Figure 4:
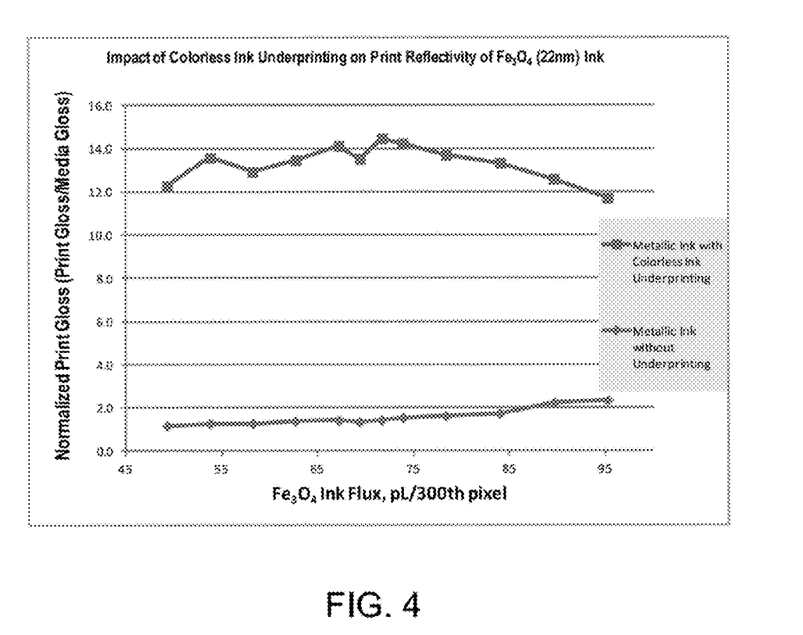
FIG. 4 provides the results of reflective ink reflectivity with and without a pre-treatment ink layer undercoating at various reflective ink layer flux application weights.

FIG. 4 sets forth a study where normalized print reflectivity of a reflective ink layer printed directly on a porous coated media was compared to the printed reflectively of the same reflective ink layer when overprinted with respect to the pre-treatment ink of Table 4 (Example 1). The pre-treatment ink was printed at a constant flux in this study, i.e. about 50 pL/300$^{th}$ pixel, and the flux of the reflective ink was varied. As can be seen, the reflective ink printed directly on porous media substrate compared to the reflective ink printed after a pre-coat of the pre-treatment ink produced significantly different results, as shown in FIG. 4, Furthermore, most print samples had at least a twelve-fold (12×) increase in specular reflectivity with the presence of the pre-treatment ink layer, whereas without the pre-treatment ink layer, a two-fold (2×) increase (over the uncoated media surface) was only achieved with high reflective ink layer densities.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. An ink set for metallic printing, comprising:
a pre-treatment ink comprising a first liquid vehicle and inorganic pigment particles having an average particle size ranging from 20 nm to 300 nm and a refractive index of less than 2; and
a reflective ink comprising a second liquid vehicle and metal oxide particles having an average particle size from 3 nm to 180 nm, wherein the average particle size of the metal oxide particles is smaller than the average particle size of the inorganic pigment particles, and wherein the reflective ink provides a specular reflectivity of at least twice that of the pre-treatment ink when the reflective ink is printed on the pre-treatment ink,
wherein one or both of the inorganic pigment particles or the metal oxide particles in their respective ink are dispersed with a polyether alkoxysilane dispersant.

2. The ink set of claim 1, wherein the pre-treatment ink and the reflective ink are inkjet inks, and wherein first liquid vehicle and the second liquid vehicle independently include water, surfactant, and organic co-solvent.

3. The ink set of claim 1, wherein the inorganic pigment particles are selected from the group of silica, alumina, boehmite, silicate, titania, zirconia, calcium carbonate, clay, and combinations thereof.

4. The ink set of claim 1, wherein the metal oxide particles are selected from the group of titanium oxides, zinc oxides, indium oxides, manganese oxides, iron oxides, and mixtures thereof.

5. The ink set of claim 1, wherein the inorganic pigment particles are present in the pre-treatment ink at a concentration ranging from 1 wt % to 35 wt % based on the total weight of the pre-treatment ink, and the metal oxide particles are present in the reflective ink at a concentration ranging from 0.1 wt % to 15 wt % based on the total weight of the reflective ink.

6. A printed article with metallic appearance, comprising:
a porous media substrate comprising a supporting base and a porous coating layer;
a pre-treatment ink layer printed on the porous coating layer, the pre-treatment ink layer comprising inorganic pigment particles having an average particle size ranging from 20 nm to 300 nm and a refractive index of less than 2, wherein the average particle size of the inorganic pigment particles are at least as large as the average pore size on a printing surface of the porous coating layer; and a reflective ink layer printed on the pre-treatment ink layer, the reflective ink layer having a metallic luster and comprising metal oxide particles having an average particle size from 3 nm to 180 nm, wherein the average particle size of the metal oxide particles is smaller than the average particle size of the inorganic pigment particles.

7. The printed article of claim 6, wherein the reflective ink layer has a specular reflectivity of at least twice that of the pre-treatment ink layer to which the reflective ink layer is applied.

8. The printed article of claim 6, wherein the pre-treatment ink layer is only printed on the porous coating layer where the reflective ink layer is substantially printed thereon.

9. The printed article of claim 6, wherein the average particle size of the metal oxide particles is also smaller than the average pore size on the printing surface of the porous coating layer.

10. The printed article of claim 6, wherein the pre-treatment ink layer and the reflective ink layer, in combination, form a printed feature with a combined thickness in the range of 40 nm to 10,000 nm, and wherein the printed feature comprises a metal oxide particles coverage in the range of 3 µg/cm$^2$ to 80 µg/cm$^2$, and wherein the reflective ink layer has a specular reflectivity at least four times greater than the pre-treatment ink layer to which the reflective ink layer is applied.

11. The printed article of claim 6, wherein the porous coating layer has an average surface pore size ranging from 3 nm to 300 nm.

12. The printed article of claim 6, wherein the inorganic pigment particles are selected from the group of silica, alumina, boehmite, silicate, titania, zirconia, calcium carbonate, clay, and combinations thereof; and wherein the metal oxide particles are selected from the group of titanium oxides, zinc oxides, indium oxides, manganese oxides, iron oxides, and mixtures thereof.

13. The printed article of claim 6, wherein one or both of the inorganic pigment particles or the metal oxide particles in their respective ink used to form the respective ink layer are dispersed with a polyether alkoxysilane dispersant.

14. A method for forming a printed article with a metallic appearance, comprising:

inkjet printing a pre-treatment ink onto a porous media substrate to form a pre-treatment ink layer, the pre-treatment ink layer comprising inorganic pigment particles having an average particle size ranging from 20 nm to 300 nm and a refractive index of less than 2, wherein the average particle size of the inorganic pigment particles are at least as large as than the average pore size on a printing surface of the porous media substrate; and inkjet printing a reflective ink onto the pre-treatment ink layer after the pre-treatment ink has at least partially dried to form a reflective ink layer, the reflective ink layer comprising metal oxide particles having an average particle size from 3 nm to 180 nm, wherein the average particle size of the metal oxide particles is smaller than the average particle size of the inorganic pigment particles, wherein the pre-treatment ink layer and the reflective ink layer remain as discrete layers relative to one another, and wherein the reflective ink layer has a specular reflectivity of at least twice that of the pre-treatment ink layer.

15. The method of claim 14, wherein the average pore size of the porous media substrate is larger than the average particle size of the metal oxide particles.

16. The method of claim 14, wherein one or both of the inorganic pigment particles or the metal oxide particles in their respective ink are dispersed with a polyether alkoxysilane dispersant.

* * * * *